United States Patent Office 2,824,783
Patented Feb. 25, 1958

2,824,783
SEPARATION OF SCANDIUM FROM AQUEOUS SOLUTIONS

Donald F. Peppard, Oak Park, and Elliot S. Nachtman, Park Forest, Ill., assignors to the United States of America as represented by the United States Atomic Energy Commission No Drawing. Application February 27, 1953
Serial No. 339,464

7 Claims. (Cl. 23—14.5)

This invention relates to a process for the separation of scandium and/or yttrium values from solutions and to the purification of scandium. The invention is also concerned with the separation of scandium from yttrium, thorium and trivalent rare earths and with their separation from each other.

Scandium occurs in various ores often together with uranium and thorium, including ionium ($Th^{230}$), for instance, in pitchblende-type ores, and also in monazite sands together with rare earths, thorium and uranium.

It is an object of this invention to provide a process whereby scandium is separated from both thorium and rare earths.

Another object of this invention is to recover scandium from aqueous solutions.

A further object of this invention is the purification of scandium from other impurities.

It is likewise an object of the instant invention to provide a method for separating scandium from organic solvents.

Other objects will be apparent upon further examination of this specification.

The aqueous waste solutions as they were obtained from the processing of aqueous ore solutions for the recovery of uranium by solvent extraction usually contained from 0.2 to 0.5 percent of the uranium, and approximately from five to eight parts per million of ionium (which is 20 to 30 mk. per gallon). The uranium to ionium ratio therein usually ranged between 150 and 400 as compared with an average of 54,000:1 in the initial ore solution, the $Th^{232}$:$Th^{230}$ ratio being 6:1. $Th^{230}$, with or without separation from $Th^{232}$, can be used in a neutronic reactor to form $Pa^{231}$ by $n,\gamma$ reaction followed by beta decay; this $Th^{230}$, or ionium, should contain not more than 1000 parts of scandium per million parts of ionium and not more than 100 parts per million of each of gadolinium, samarium and europium.

Since the ionium concentration in the ore waste solution is relatively small, the initial treatment of the ore solution necessarily involves a concentration step; this may be done in accordance with the process forming the subject matter of copending application Serial No. 740,274, filed April 8, 1947, for "Solvent Extraction Process for Purification of Thorium," by Frank H. Spedding and Arthur Kant, and granted as Patent No. 2,796,320 on June 18, 1957, or by other processes, for instance, by precipitation and re-dissolution or by extraction with solvents, such as dibutyl ester of tetraethylene glycol ("pentaether") or diethyl ether or by chelation-extraction using a complexing agent such as thenoyltrifluoroacetone.

Extraction with pentaether and subsequent re-extraction of the thorium and uranium from the pentaether with water, for instance, usually reduces the volume of ionium- and uranium-containing solution by a factor of about 20. These more concentrated solutions, for instance, have been contacted with a cation exchange resin followed by washing of the resin with 0.5 N sulfuric acid for elution of most of the uranium. The ionium was then eluted with a solution 1 N in ammonium sulfate and 0.1 N in sulfuric acid. The latter eluates, on an average, contained, per one million parts of ionium, 70 parts of uranium, 32,000 parts of scandium, and 160,000 parts of yttrium.

Rare earth metal values are generally not extracted by the above-mentioned organic solvents. However, it has been discovered that scandium values, usually classified with the rare earths on account of its similar chemical behavior (cf. Chemical and Engineering News 28, 1476, May 1, 1950), can be separated from the trivalent rare earths proper contained in an acidic aqueous solution by selective extraction with some organic solvents, namely alkyl phosphates and pentaether. Pentaether has a slight tendency to polymerize under the acid conditions necessary for scandium extraction which can make phase separation difficult. For this reason alkyl phosphates are the preferred solvents. By alkyl phosphates are meant compounds that have the general formula

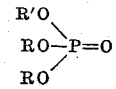

wherein R may denote either a hydrogen atom or an alkyl radical and R' designates an alkyl radical. An alkyl phosphate having a total of at least 12 carbon atoms in the molecule is desirable in order to have a sufficiently high degree of water-immiscibility. Tributyl phosphate is the preferred alkyl phosphate; however, trioctyl phosphate, dioctyl hydrogen phosphate, etc. are also suitable. Mixed alkyl phosphates, e. g. a mixture of tributyl phosphate and dibutyl hydrogen phosphate or a mixture of, for instance, 30 percent monobutyl dihydrogen phosphate and 60 percent dibutyl hydrogen phosphate are also satisfactory. The ratio employed of solvent to aqueous solution has ordinarily been one to one, but it can be varied widely. Moreover, the alkyl phosphate can be mixed with a suitable organic diluent, such as hexone or carbon tetrachloride, whereby the viscosity of the extractant is decreased and phase separation is facilitated.

Scandium values, it was found, are extracted from aqueous mineral acid solutions containing a salting-out agent; the acid concentration may range between 0.2 and 16.0 N and preferably between 5 and 8 N; monobasic mineral acids, such as hydrochloric acid and nitric acid, are preferred for acidification of the aqueous solutions, and nitric acid was found to be the most satisfactory acid. The extraction of scandium with pentaether as well as with tributyl phosphate, for instance, increases with the nitric acid concentration.

The extraction from the acid solution is improved by the addition of a salting-out agent. Water-soluble alkali and alkaline earth chlorides and nitrates are suitable salting-out agents for hydrochloric acid and nitric acid aqueous solutions, respectively; their concentration may range between 0.2 and 10 N. Likewise, manganese, lanthanum, and aluminum chlorides and nitrates can be used as salting-out agents. Aluminum nitrate is the preferred salting-out agent in the nitrate system.

Scandium can be isolated from an aqueous solution containing it together with trivalent rare earth metal values and thorium values by providing an acidity of between 3 and 11.8 M in HCl, but preferably between 6 and 8 M in HCl, in the aqueous solution, then contacting the solution with trialkyl phosphate whereby scandium is extracted by the alkyl phosphate, and thereafter separating the scandium-containing solvent extract phase from an aqueous phase in which the bulk of the thorium and rare earth values were retained. The scandium values contained in the trialkyl phosphate extract phase can be removed therefrom by contact with water or preferably with an aqueous solution up to 2 N in HCl.

Where scandium is dissolved in the organic solvent together with thorium, yttrium, and rare earth metal values, the thorium, yttrium, and rare earth values are selectively re-extracted by contacting the solvent phase with an aqueous solution 6.5 M or 8 M in HCl. The addition of orthophosphoric acid to the aqueous hydrochloric acid solution improves the back-extraction of thorium values from the organic solution.

It has been found that the use of mixed solvent, such as tributyl phosphate and its hydrolysis products, monobutyl phosphate and dibutyl phosphate, gave better results than tributyl phosphate alone. For example, the dibutyl phosphate showed an especially strong affinity for thorium values so that treatment of an organic phosphate solution containing thorium and the other values mentioned above with aqueous hydrochloric acid solution resulted in back-extraction of yttrium and rare earth values only when the solvent was such a mixed phosphate.

The alkyl phosphate extraction of yttrium from aqueous hydrochloric acid solutions was found to be fifty times higher than the extraction of any rare earth value under equal conditions. However, the extent of the yttrium extraction is substantially less than that for scandium from hydrochloric acid, but only slightly different from nitric acid solutions. For instance, the distribution ratio (tributyl phosphate/aqueous solution) for scandium from an aqueous solution 0.4 N in nitric acid and 7.2 N in aluminum nitrate proved to be 1890, while that for yttrium under identical conditions was found to be 800.

Gross quantities of rare earths in the aqueous solution tend to decrease the yttrium distribution ratio in the organic solvent phase. However, the distribution for yttrium was found to be quadrupled, at temperatures of about 25° C., by raising the concentration of hydrochloric acid in the aqueous solution from 11.8 M to 13.1 M. In extracting yttrium values from aqueous nitric acid solutions, the preferred acid anion concentration (which includes that of a salting-out salt) is between about 7 N and 16 N, and the best solvent is tributyl phosphate. The distribution ratio for yttrium in tributyl phosphate is markedly increased by the addition of a salting-out agent, such as ammonium nitrate or even still more by aluminum nitrate.

The thorium extraction by commercial tributyl phosphate, discussed above, is repressed, it was found, by adding a citric acid and/or citrate buffer to the aqueous solution. The extraction of scandium, which is high by pure as well as by dibutyl phosphate-containing tributyl phosphate, is greatly repressed only in the case of pure tributyl phosphate by the addition of these buffers, while with the commercial product the extraction is not radically reduced. These facts can be utilized in the selective back-extraction of scandium and/or thorium.

It has also been found that actinium may be separated from aqueous solutions containing scandium and other salts such as lead, radium, thorium, polonium and/or bismuth by a combination of pentaether extraction and tributyl phosphate extraction. Thus an aqueous, weak nitric-acid solution saturated with aluminum or ammonium nitrate and containing all of the above-listed values was first extracted with pentaether whereby the scandium, thorium, polonium, and bismuth were preferentially extracted while the lead, radium, and actinium remained in the aqueous raffinate. This raffinate was then contacted with tributyl phosphate whereby the actinium was extracted and thus separated from the lead and radium.

While actinium is not extracted by tributyl phosphate from aqueous solutions such as 0.3 M nitric acid, it can be extracted therefrom, as has just been shown, if the aqueous solution is saturated or highly concentrated in regard to a salting-out agent.

The following examples illustrated the various separations possible by the process of the instant invention.

EXAMPLE I

An aqueous nitric acid tracer feed solution of the 85-day half-life $Sc^{46}$ isotope was prepared, and the distribution ratios in pentaether (PE) and tributyl phosphate (TBP), respectively, were determined by contacting solvent and aqueous feed. The concentrations of acid and of aluminum nitrate and ammonium nitrate, respectively, as salting-out agents are shown in the table below together with the D. R. (=distribution ratio organic/aqueous) obtained in each instance.

*Distribution ratios of $Sc^{46}$ into pentaether and tributyl phosphate*

| | D. R. into PE | | | D. R. into TBP | | | Vol. Solvent: Vol. Aqueous |
|---|---|---|---|---|---|---|---|
| Initial HNO₃ Concn | 0.2 N | 0.4 N | 1.5 N | 0.2 N | 0.4 N | 1.5 N | |
| Initial Salt Concn.: | | | | | | | |
| 8 N NH₄NO₃ | 0.19 | | 0.26 | 200 | | 24 | 1:1 |
| 10 N NH₄NO₃ | 0.38 | | 0.49 | 480 | | 70 | 1:1 |
| 7.2 N Al(NO₃)₃ | | 5.4 | | | 1,890 | | 1:6 |

The foregoing data illustrate the effect of increase of acid concentration on the extraction of scandium with tributyl phosphate and the favorable effect of increase of salting-out agent concentration for either solvent used. The extraction into pentaether increases with increasing acid concentration. Al(NO₃)₃ is greatly superior to NH₄NO₃ as a salting-out agent.

EXAMPLE II

A series of extractions with tributyl phosphate was carried out to determine the distribution ratios (organic/aqueous) for scandium, thorium, and yttrium from aqueous hydrochloric acid solutions containing various acid concentrations. The tributyl phosphate had been washed with 2 N NaOH in order to remove hydrolysis products and then with water; thereafter it was pre-equilibrated with hydrochloric acid of a concentration equal or similar to that present in the aqueous phase.

*Extraction of scandium, thorium, and yttrium into tributyl phosphate from aqueous hydrochloric acid*

| Molarity of HCl in the Aqueous Phase | Distribution Ratios (Organic/Aqueous) | | |
|---|---|---|---|
| | Sc | Y | Th |
| 3.0 | 0.04 | <0.001 | 0.001 |
| 6.4 | 32 | 0.001 | 0.02 |
| 8.0 | 50 | 0.05 | 0.08 |
| 11.8 | | | 5.3 |

The possibility of a sharp separation of scandium from thorium and or yttrium is apparent from the above data.

EXAMPLE III

Three quantities, each 20 cc., of tributyl phosphate, washed and pre-equilibrated as described in Example II, were placed in three extractors and were contacted in series with 20 cc. of aqueous feed solution 6.5 M in HCl and containing $Sc^{46}$ emitting $4.4 \times 10^6$ β-counts/minute (counted on the first shelf, 5 mg. Al absorber) and $Th^{230}$ emitting $1.3 \times 10^8$ α-counts/minute. The feed was contacted in the first extractor for 5 minutes, the aqueous raffinate was then introduced into the second extractor and contacted for 5 minutes with the tributyl phosphate therein, and the aqueous phase from this extraction was identically treated in extractor No. 3. Thereafter three 20-cc. portions of 6.5 M HCl were consecutively contacted with the three organic extracts in the same way as the feed, and these scrubs were followed by three final 20-cc. quantities of 2 M HCl. The contact time for each treatment was also 5 minutes. The aqueous raffinate leaving the third extractor after cycling of the feed was found to contain 90 percent of the thorium orginally present, while about 98 percent of the scandium present were extracted into the solvent. The first scrub solution, after contact, contained about 6 percent of the total thorium, which was slightly more than half of the thorium extracted, and also about 1 percent of scandium. The second scrub with 6.5 M HCl contained about 2 percent of thorium and 4 percent of scandium, while the third scrub contained about 2 percent of the thorium and 5 percent of the scandium. The 2 M HCl, after the first contact, was found to contain 72 percent of the scandium, after the second about 15 percent and after the third about 1 percent; all three of these 2 M HCl solutions were, of course, free from thorium.

EXAMPLE IV

A solution obtained in processing $Th^{230}$ was 8 M in HCl and contained 50 mg. of scandium, 50 mg. of thorium, 100 mg. of yttrium, and a total of 1 g. of all the members of the rare earths, with the exception of $Pm^{61}$. 250 ml. of this "feed" solution were successively passed through two extractors each of which contained 100 cc. of unhydrolyzed tributyl phosphate; the two extract phases obtained were scrubbed in series, first with four 50-cc. portions of 5 M HCl and then treated in series with four 50-cc. portions of water. The aqueous raffinate and the eight other aqueous solutions leaving the second extractor were analyzed, and from the data obtained the following conclusions were drawn: The tributyl phosphate extracted about 2 percent of the total rare earths content, about 4 percent of the yttrium, about 6 percent of the thorium and all of the scandium present. The first 5 M HCl-scrub, after leaving the second extractor, containing the extracted 2 percent of rare earths, the extracted 4 percent of yttrium and the extracted 6 percent of thorium; the second scrub contained 3 percent, the third 9 percent and the fourth 13 percent of the scandium extracted. The first of the water treatments back-extracted the bulk of the scandium, namely 70 percent, while the remaining 5 percent were totally extracted by the second water scrub.

EXAMPLE V

It was demonstrated in Example II that scandium and thorium can be separated by extraction with tributyl phosphate from a hydrochloric acid system. It has also been mentioned that the presence of dibutyl phosphate in tributyl phosphate markedly increases the extractability of thorium.

Tests were carried out with tributyl phosphate solutions containing dibutyl phosphate and a series of aqueous solutions. An aqueous solution containing both hydrochloric and phosphoric acids was found to back-extract thorium from such a mixed solvent to a high degree. The back-extraction was still further improved by employing a citrate-buffered aqueous medium in either the selective extraction and/or back-extraction of thorium and scandium; the presence of the citrate buffer inhibited extraction of thorium by the mixed solvent, and citrate-buffered aqueous wash solutions also removed a large percentage of the thorium from a solution in such a mixed alkyl phosphates solvent.

In the following table the distribution ratios for thorium, scandium and uranium are given as they were determined by a series of batch extractions from various aqueous solutions with tributyl phosphate washed free of hydrolysis products and also with a mixture of tributyl phosphate ocntaining 10 percent of dibutyl phosphate. The results show that citric acid represses the extraction of scandium considerably in the case of pure tributyl phosphate and also that of thorium by the mixed alkyl phosphates.

*Distribution ratios of thorium, scandium, and uranium into butyl phosphate solvents from various aqueous phases*

| Aqueous Phase | Washed TBP | | 90% TBP—10% DBP | | |
|---|---|---|---|---|---|
| | Th | Sc | Th | Sc | U |
| 15.6 M $HNO_3$ | | 760 | | | |
| 8 M HCl | 0.08 | 50 | >1,000 | >300 | |
| 10 M $NH_4NO_3$, 0.5 M citric acid | 0.02 | 0.001 | 12 | 215 | |
| 4 M $NH_4NO_3$, 1.3 M $NH_4$ citrate, 0.3 M citric acid | 0.07 | 0.003 | 0.11 | 144 | 56 |
| 1.3 M $NH_4$ citrate, 0.3 M citric acid | | | 0.04 | 67 | 28 |

In the following an example is given for the use of citrate-buffered solutions.

EXAMPLE VI

A 20-cc. portion of an aqueous feed containing $Th^{230}$ ($10^7$ α-counts/minute), $Sc^{46}$ ($10^7$ β-counts/minute, second shelf, 7.36 mg. of Al) and being 1.3 M in ammonium citrate and 0.2 M in citric acid was passed successively through three extractors each of which contained 20 cc. of a solvent mixture; this was carried out as described in previous examples. The solvent consisted of a mixture of 90 percent of tributyl phoshpate and 10 percent of dibutyl phosphate; it had been pre-equilibrated with an aqueous solution 1.3 M in ammonium citrate and 0.2 M in citric acid. The aqueous raffinate obtained thereby from the third extractor was designated solution S1.

Thereafter three 20-cc. portions of a scrub solution 1.3 M in ammonium citrate and 0.2 M in citric acid were consecutively passed through the three extractors; the effluents are designated as S2, S3, and S4. The three solvent portions thus treated are E1, E2 and E3, respectively.

Solutions S1–S4 and E1–E3 were analyzed as their thorium and scandium contents, and the respective distribution ratios (organic/aqueous) were calculated therefrom. The results are given in the table below.

*Separation of thorium from scandium by means of a butyl phosphate-aqueous citrate system*

| Solution | Percentage Distribution throughout Solutions | |
|---|---|---|
| | Thorium | Scandium |
| E1 | <0.01 | 93.5 |
| E2 | <0.01 | 6.1 |
| E3 | <0.01 | 0.4 |
| S1 | 95.6 | <0.04 |
| S2 | 4.2 | <0.04 |
| S3 | 0.13 | <0.04 |
| S4 | $1 \times 10^{-2}$ | <0.04 |

More than 99 percent of the scandium was decontaminated from thorium by a factor in excess of $5 \times 10^3$ while more than 99 percent of the thorium was decontaminated from scandium by a factor in excess of $1 \times 10^3$. Both the yield and the extent of decontamination are, of course, further improved by a suitable increase in the number of successive extractions and scrubs.

The instant process can be adapted to either batch or continuous operation; countercurrent operation is preferred.

The scope of the instant invention is not to be limited by the details shown in the foregoing examples which are merely illustrative of individual phases of the instant invention, but it is to be limited in scope only by the claims appended hereto.

What is claimed is:

1. The process of separating scandium values from aqueous mineral acid solutions which comprises contacting an aqueous acidic solution containing said scandium values and mineral acid in a concentration of between 6 and 8 M with tributyl phosphate, and separating an aqueous phase and an extract phase containing said scandium values.

2. The process of separating scandium values from an aqueous solution which comprises acidifying said aqueous solution with a monobasic mineral acid to obtain a concentration of between 6 and 8 M, contacting said aqueous solution with tributyl phosphate, and separating an aqueous phase and an extract phase containing said scandium values.

3. A process of separating scandium values from trivalent rare earths values, yttrium values and thorium values, comprising providing an aqueous phase containing hydrochloric acid in a concentration of between 6 and 8 M and a tributyl phosphate phase, one of said phases initially containing said scandium, thorium and rare earths and yttrium values dissolved; contacting said two phases whereafter said thorium, yttrium and rare earths values are preferentially contained in said aqueous phase while said scandium values are preferentially contained in said tributyl phosphate phase; and separating said two phases.

4. The process of claim 3 wherein the separated tributyl phosphate phase is contacted with water up to 2 M in hydrochloric acid whereby said scandium values are extracted from the solvent into said water.

5. A process of separating scandium values from trivalent rare earths values, comprising providing an aqueous phase containing hydrochloric acid in a concentration of between 6 and 8 M and a tributyl phosphate phase, one of said phases initially containing said scandium and rare earths values dissolved; contacting said two phases whereafter said rare earths values are preferentially contained in said aqueous phase while said scandium values are preferentially contained in said tributyl phosphate phase; and separating said two phases.

6. A process of separating scandium values from thorium values, comprising providing an aqueous phase containing hydrochloric acid in a concentration ranging between 6 and 8 M and a tributyl phosphate phase, one of said phases initially containing said scandium and thorium values dissolved; contacting said two phases whereafter said thorium values are preferentially contained in said aqueous phase while said scandium values are preferentially contained in said tributyl phosphate phase; and separating said two phases.

7. A process of separating scandium values from yttrium values, comprising providing an aqueous phase containing hydrochloric acid in a concentration ranging between 6 and 8 M and a tributyl phosphate phase, one of said phases initially containing said scandium and yttrium values dissolved; contacting said two phases with each other whereafter said yttrium values are preferentially contained in said aqueous phase while said scandium values are preferentially contained in said tributyl phosphate phase; and separating said two phases.

References Cited in the file of this patent

UNITED STATES PATENTS 2,227,833   Hixson et al. _____ Jan. 7, 1941

OTHER REFERENCES

Warf: U. S. Atomic Energy Comm. declassified document AECD–2524, August 7, 1947, declassified March 11, 1949 (10 pages).

Perry: Chemical Engineer's Handbook, 3rd ed., page 714 (1950), McGraw-Hill Co., N. Y.